Figure 1:
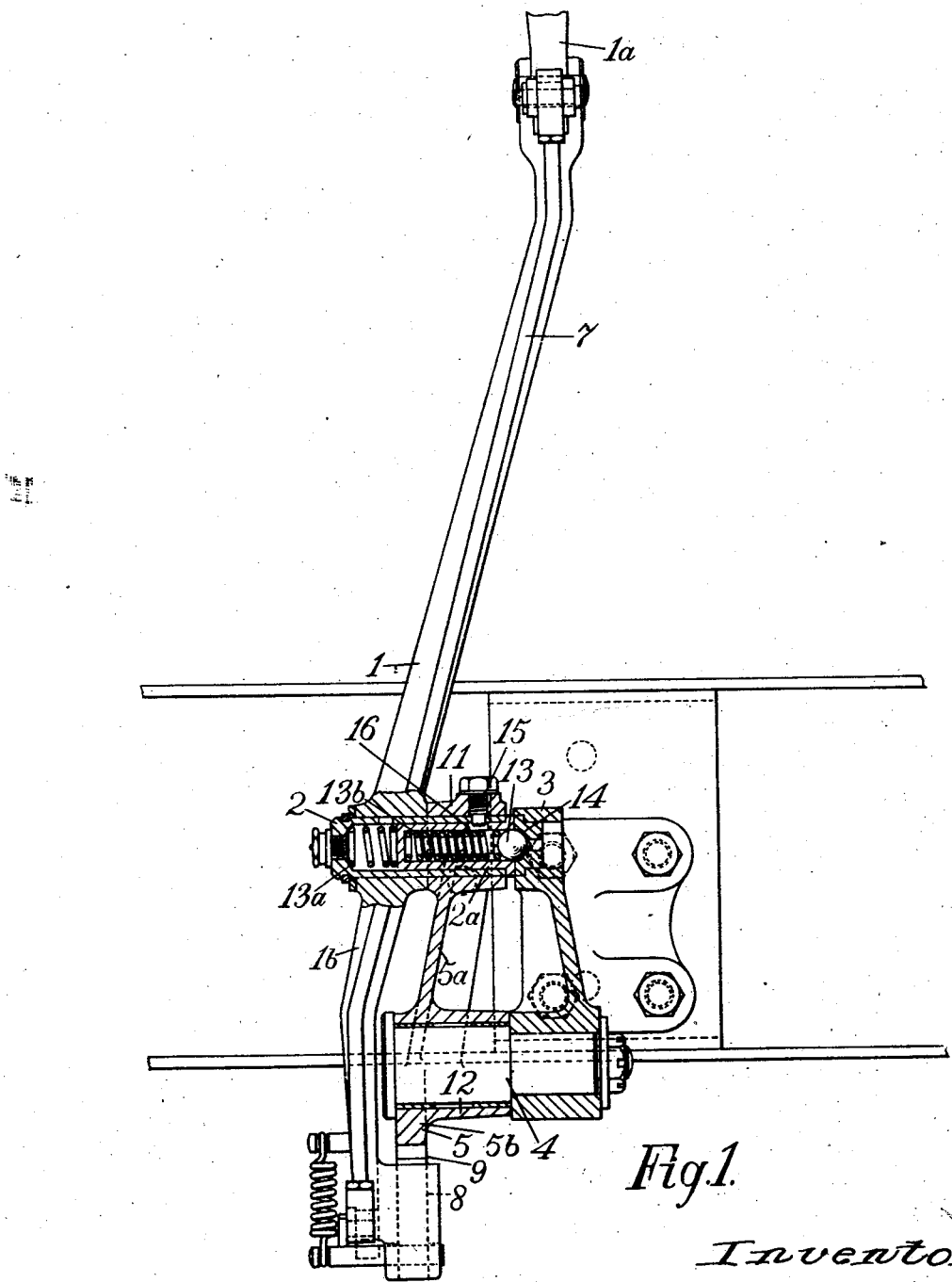

Aug. 14, 1945.  C. H. WHITE  2,382,192
BRAKE MECHANISM
Filed Dec. 6, 1943  4 Sheets-Sheet 1

Inventor
C. H. White

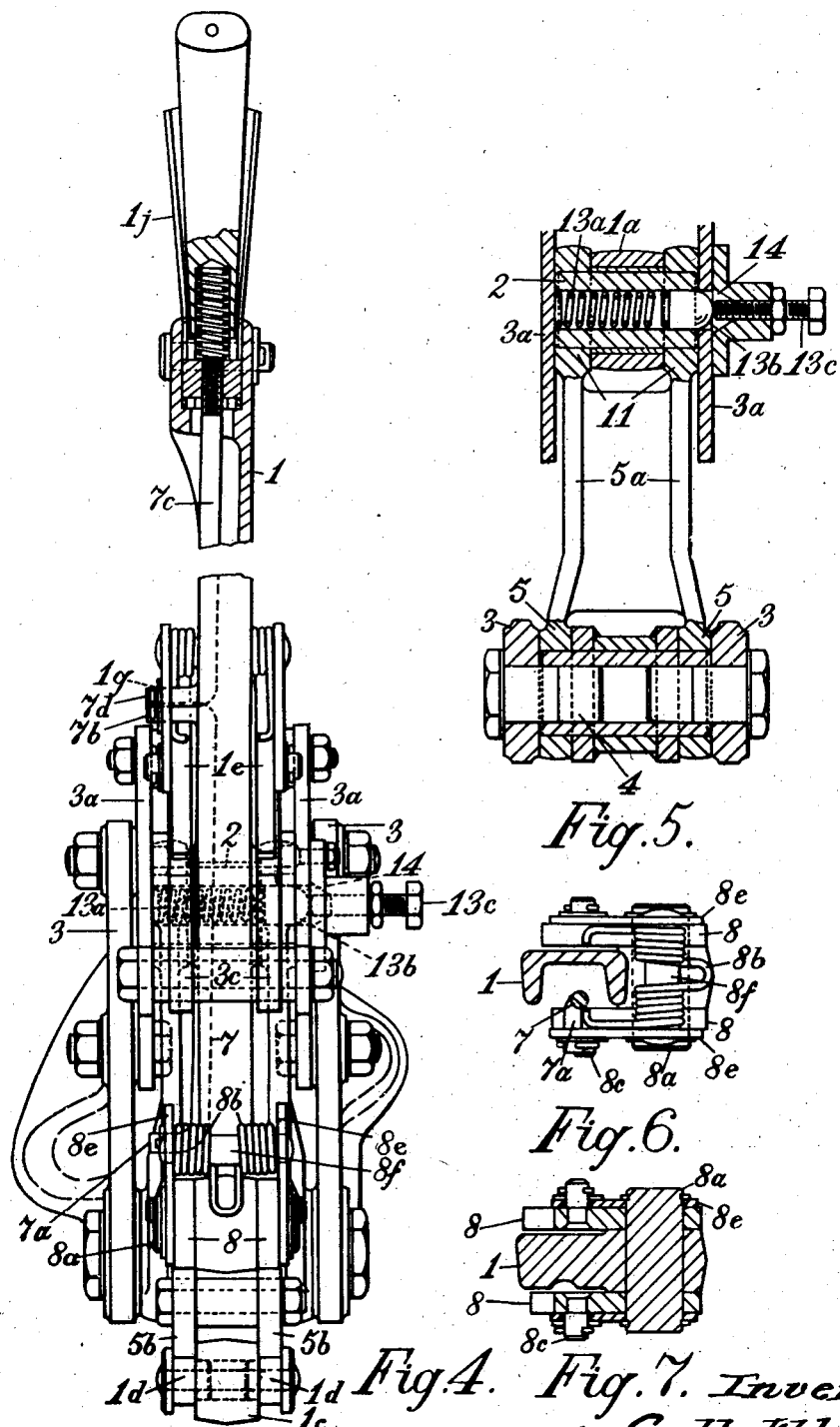

Patented Aug. 14, 1945

2,382,192

UNITED STATES PATENT OFFICE 2,382,192

BRAKE MECHANISM

Charles Hector White, Luton, England, assignor to Commer Cars Limited, Luton, England Application December 6, 1943, Serial No. 513,165 In Great Britain December 8, 1942

3 Claims. (Cl. 74—518)

The invention has for its object to provide a twin (Low-High) ratio handbrake lever mechanism, which when fitted, particularly to a commercial vehicle or a commercial vehicle adapted for use with a trailer, effects the operation of the brakes with a designed minimum of hand travel by, in the first movement, pulling up the slack and initially loading the brake parts to a predetermined load with the automatic use of the low ratio, and then a second movement which performs the main operation of the brakes and is effected by the high ratio, which comes into effect automatically immediately the predetermined initial loading of the brake parts is exceeded.

According to the invention the handbrake lever in its design is, in the main, of standard pattern, i. e., it incorporates in its design a handgrip, means for engaging a locking mechanism, e. g., a pawl, an output connection point for attachment to the brake parts, while the fulcrum, to accord with the invention, is so placed that the lever is of comparatively low ratio. Attached to the handbrake lever fulcrum (called the first pivot) is a second lever which bears a ratchet plate, or means for locking it to the handbrake lever. This second lever pivots about a fixed fulcrum (called the second pivot) and is so placed in the design that its position relative to the handgrip is of comparatively high ratio to that which it bears to the output connection point on the handbrake lever.

The first pivot is retained in a determined position by either a sprung or frictional load equal to the sum of the predetermined initial output load and that load which is of necessity exerted by the handgrip on the hand lever. An example of this retaining load is given in regard to the invention as a spring loaded ball exerted against a groove or hole in a fixed plate or bed. This retaining load could also be effected by other means such as a hydraulic or electrical device.

In the first movement the handbrake lever is operative in the low ratio only while its fulcrum is retained, while its movement, relative to the second lever, is registered upon a non-return or locking device consisting, for instance, of a pawl and ratchet.

During the first movement the second lever is immobile and relies upon the release of the first pivot before it can rotate around its own fulcrum, namely, the second pivot. The second movement of high ratio becomes operative upon this condition, i. e., when the hand and initial output loads exceed that load which retains the first pivot, and continues until the normal operation of the brake has been effected.

On the release of the handbrake, and return of the first pivot to its original position, the pawl can be either disengaged from the ratchet direct, or by a remotely controlled device, or alternatively lost motion between the pawl and ratchet can be arranged to effect the non-essentiality of the disengaging operation, by allowing the connection end of the hand lever to fall back a designed amount related to the minimum shoe-drum clearance.

With such an arrangement the handbrake will automatically adjust the brake, since it would control the shoe-drum clearance. The lost motion could take the form of an elongated hole in the ratchet plates at the second pivot.

It will be evident that such a mechanism represented by levers or like parts, can be a means of taking up slack or initially loading any mechanism which would profit thereby.

In the accompanying drawings—

Figure 2:
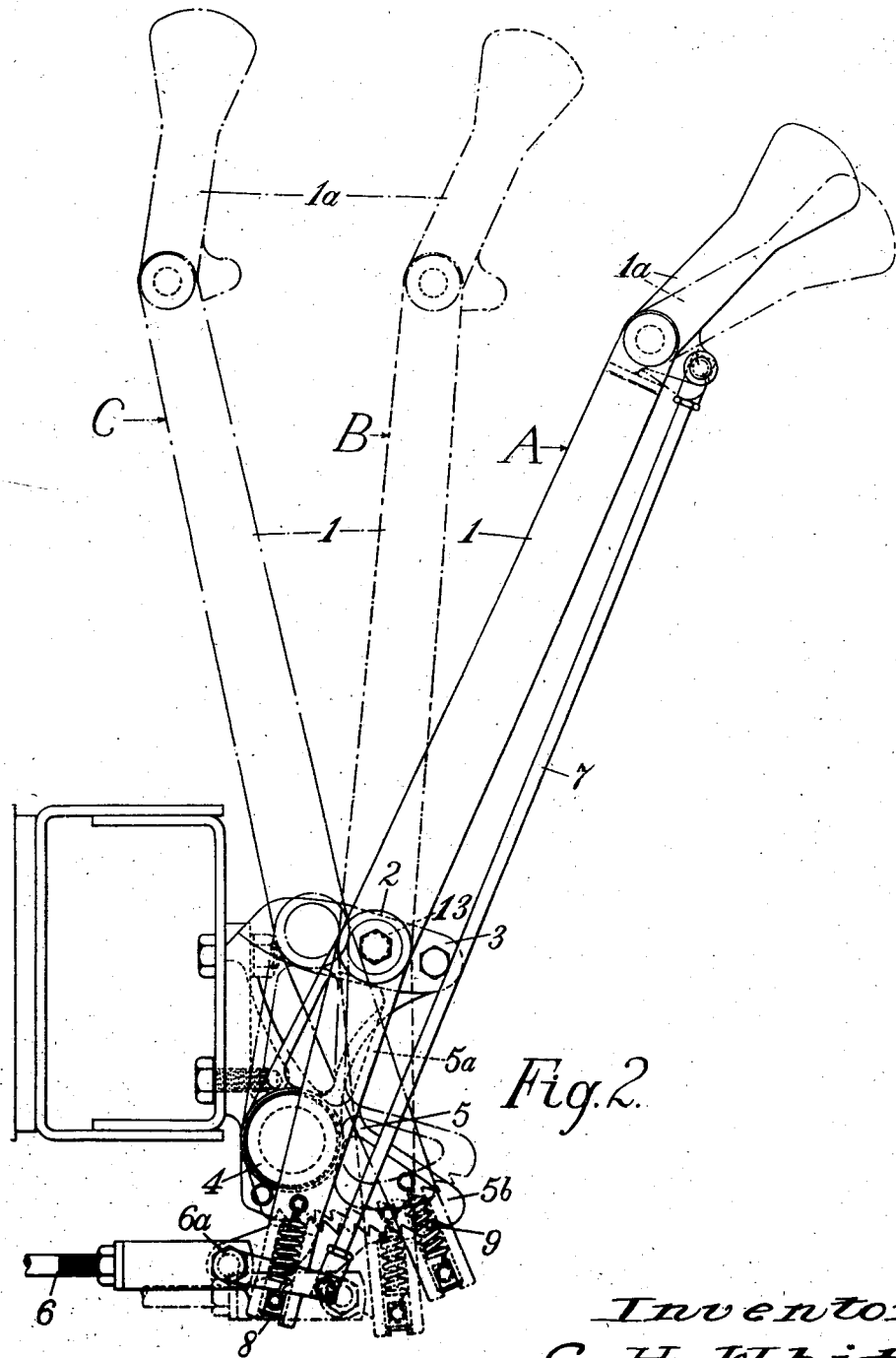
Figure 3:
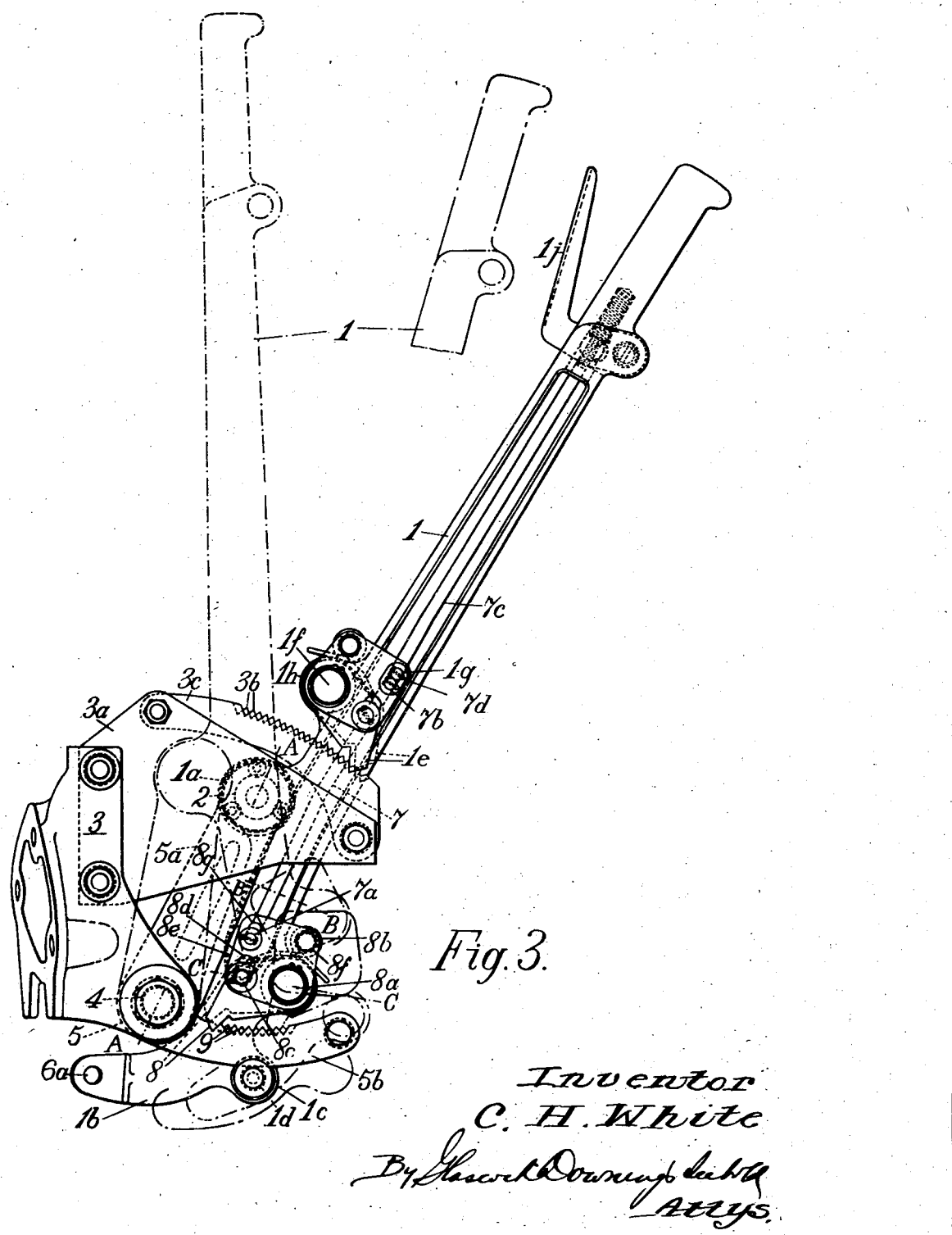

Figure 1 is an end elevational view, partly in section, of a handbrake lever mechanism in accordance with the invention, Figure 2 is a side elevational view of the mechanism, Figure 3 is a view similar to Figure 2 but of a modified and preferred form of the invention, Figure 4 is an end elevational view partly in section of Figure 3, Figure 5 is a detail section on the line A—A of Figure 3, Figure 6 is a detail section on the line B—B of Figure 3, and Figure 7 is a detail section on the line C—C of Figure 3.

In carrying the invention into effect in one convenient manner as illustrated in the drawings wherein like parts are given the same references, but referring first to the form of mechanism illustrated in Figures 1 and 2, a handbrake mechanism is provided comprising a hand lever 1 which is pivotally mounted upon an axis pin 2 which has frictional engagement with a fixed plate or bracket 3 which carries a fixed axis pin 4 about which a second lever 5a, forming one arm of a bell crank lever 5, also connected with the said first axis pin is pivotal when the said frictional connection is overcome or broken and the first axis pin 2 becomes a floating pivot, the first said axis pin being located farther away from the point of connection 6a of the brake lever with the rod or link 6 which provides the connection to the brake shoe or the like, than the second and fixed axis pin 4, which latter is disposed in close proximity to the said point of connection.

The handbrake lever, at its outer end, may be formed with the conventional pivoted handgrip 1a connected with the usual rod 7 by which a spring loaded pawl 8 engageable with a ratchet 9 at the inner end of the hand lever is actuated in consequence of the handgrip 1a being swung about its pivot in the act of swinging the hand lever to apply or release the brakes. In the construction as now proposed the ratchet teeth are provided along the outer edge of the other arm 5b of the bell crank lever 5, the arm 5a of which constitutes the "second" lever above referred to, and the outer end of which arm 5a is formed with a boss 11 through which the axis pin 2 constituting the first pivot extends so that the lower end 1b of the hand lever, which projects beyond this pivot, and the said bell crank lever 5 lie adjacent one another with the one arm 5a of the bell crank fixed about the axis pin 2 of the hand lever and the central boss 12 of the bell crank lever pivotal about the fixed axis pin 4 on the said bracket 3.

The axis pin 2 providing the first pivot for the hand lever may, as shown in Figure 1, be in the form of a hollow plug within which a second hollow plug 2a, or plunger, is mounted and has at its outer end a ball 13 which is normally spring biased into engagement with a detent 14 on the said fixed bracket. The biasing of the ball into frictional contact with the detent may be by a compression spring 13 inserted in the outer plug 2, constituting the first pivot so as to operate between the inner end of the said plunger 2a and the opposite and closed end of the plug and by another compression spring 13a inserted within the plunger 2a to operate between the ball 13 and the opposite and closed end of the plunger. The bell crank lever 5 may be fixed upon the first pivot by a screw stud 15 passed through the bossed end 11 of the arm 5a of the bell crank and entered into an elongated slot 16 in the said plug. Provision may be made for effecting a certain degree of adjustment of the spring loading of the said ball and consequently of the frictional contact with the fixed plate or bracket. The arrangement is such that the first movement of the hand lever 1 takes place by the lever pivoting about the first pivot constituted by the said plug 2, which continues until the frictional loading imposed by the engagement of said ball 13 with the detent 14 is overcome, when this pivot will become a floating pivot, moving as one with the lever 1 and its bottom extension 1b and the bell crank lever 5 will come into operation and turn about its fixed pivot 4, which then constitutes the effective and second pivot for the hand lever.

Thus, and referring to Figure 2, the first movement of the hand lever will be about the first pivot 2 and cause the handgrip end thereof to travel from its original position A to the position B. During this time the bell crank lever 5 is held stationary due to the spring loading of the ball 13 and the pawl 8 rides over the ratchet teeth 9. This first lever movement is of low ratio and is sufficient to enable the slack to be taken up and the brakes initially loaded. When the retaining load on the ball 13 is superseded by the sum of the output and hand loads the first pivot becomes immediately and automatically ineffective and in the second part of its movement from the position B to the position C the hand lever together with the bell crank lever 5 (the pawl being now locked in engagement with one of the ratchet teeth) rotate as one about the second pivot 4 until the brakes have been applied and this second movement is of a high ratio.

Referring now to the preferred form of the invention as illustrated in Figures 3 to 7, the hand lever 1 has a boss 1a through which the hollow plug 2 passes to provide the "first" pivot and which plug extends between a pair of spaced fixed side plates 3a, one of which is formed with the detent 14 for a ball-ended plug 13b which is resiliently mounted within the plug 2 by the compression spring 13a, the end of which remote from the ball-ended plug bears against the other fixed plate 3a. Adjustment of the initial loading of the ball-ended plug is possible through the actuation of an adjusting screw 13c.

The bell crank lever 5 has bifurcated arms 5a and 5b of which the arms 5a constitute the "second" lever and at their outer ends are formed with the bosses 11 for the axis pin 2 constituting the "first" pivot and the other arms 5b of which are provided along their inner edges with the ratchet teeth 9. The bell crank lever 5 is mounted at its centre about a fixed pin 4, constituting the "second" pivot, the fixed pin being secured at its ends in the fixed bracket 3 carrying the said plates 3a.

A pawl 8 is provided for engagement with the ratchet teeth on each arm 5b and the two pawls are mounted about a cross pin 8a carried upon a boss 1a formed on the lever 1. The pawls are spring biassed by a torsion spring 8b and each pawl is provided with a pin 8c each of which engages in a slot 8d in one of a pair of plates 8e each pivoted about the cross pin 8a. The torsion spring 8b is carried upon a pin 8f which is carried between the two plates 8e so as to be rigid therewith. One plate 8e has another elongated slot 8g in which the bent inner end 7a of the hand lever rod 7 engages such that the latter may be actuated to swing the two plates 8e, together with their pawls 8, to release the latter from engagement with their ratchet teeth 9. The elongated form of the slots 8d and 8g provide freedom of action to the pawls when in engagement with their respective ratchet teeth.

The hand lever, at its lower end 1b, is provided with the brake rod connection point 6a and is also formed with a boss 1c to which a pair of bobbins 1d are secured for engagement with the lower edge of the ratchet arms 5b.

From the foregoing description of the invention, and its illustrated application to a handbrake lever of the hold-on or driving brake type, it will be obvious that if to such an application is added a ratchet plate and pawl of standard pattern, the result will be a handbrake lever of the normal parking type.

Thus, as illustrated, in the preferred embodiment according to Figures 3 to 7 the brake mechanism may be incorporated in a handbrake lever of the normal parking type by the hand lever 1 being provided with a pair of pawls 1e engaged with ratchet teeth 3b formed on plates 3c fixed to the plates 3a. The pawls 1e are pivotally mounted about a transverse pivot pin 1f carried in a boss 1h formed on the hand lever. This pawl mounting is a replica of the pawl mounting 8 to 8g above described but is reversed in position and the elongated slot 1g in the one side plate thereof contains not only the bent outer end 7b of the rod 7 but also the inner bent end 7d of another rod 7c by which the pawl actuating motion resulting from the operation of the conventional hand grip lever 1j on the hand lever 1 is transmitted to both sets of pawls.

I claim:

1. A vehicle handbrake comprising a first pivot, a hand lever movable about said pivot, a second pivot, a second lever movable about the second pivot and supporting the first pivot, and means releasably restraining movement of the first pivot whereby, during its initial movement, said hand lever moves about the first pivot and, when the restraint of the releasable means is overcome, the hand lever moves about the second pivot, the restraining means including a member incorporated in the first pivot and resiliently urged into contact with a fixed part to provide a frictional loading equivalent to the sum of a predetermined initial output load and the load which is exerted when the hand lever is actuated.

2. A vehicle handbrake comprising a first pivot, a hand lever movable about said pivot, a second pivot, a second lever movable about the second pivot and supporting the first pivot, and means releasably restraining movement of the first pivot whereby, during its initial movement, said hand lever moves about the first pivot and, when the restraint of the releasable means is overcome, the hand lever moves about the second pivot, the second lever being constituted by one arm of a bell crank lever, ratchet teeth on the other arm of the bell crank lever, a pawl engageable with the ratchet teeth, and a hand grip on the hand lever for actuating the pawl.

3. A vehicle handbrake comprising a first pivot, a hand lever movable about said pivot, a second pivot, a second lever movable about the second pivot and supporting the first pivot, and means releasably restraining movement of the first pivot whereby, during its initial movement, said hand lever moves about the first pivot and, when the restraint of the releasable means is overcome, the hand lever moves about the second pivot, the second lever being constituted by one arm of a bell crank lever, ratchet teeth on the other arm of the bell crank lever, a pawl engageable with the ratchet teeth, and a hand grip on the hand lever for actuating the pawl, a stationary set of ratchet teeth, and a cooperating pawl also actuated by the hand grip.

CHARLES HECTOR WHITE.